M. M. GILLAM.
ADJUSTABLE HEAT AND FUEL ECONOMIZER.
APPLICATION FILED JUNE 13, 1914.

1,138,745.

Patented May 11, 1915.
2 SHEETS—SHEET 1.

FIG. 1.

FIG. 2.

WITNESSES

INVENTOR
Manly M. Gillam,
BY
J. Walter Douglass.
ATTORNEY

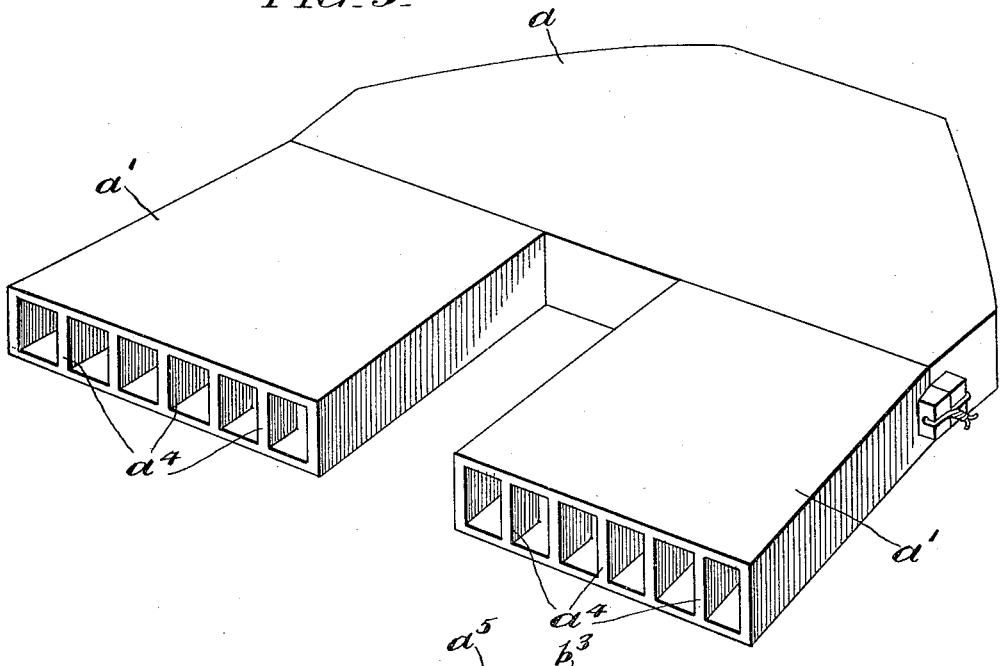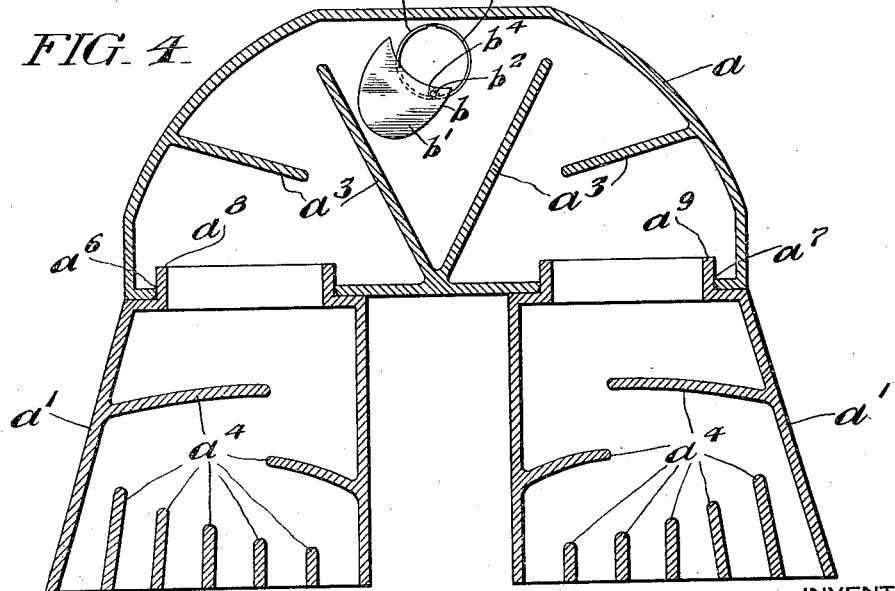

UNITED STATES PATENT OFFICE.

MANLY M. GILLAM, OF FLUSHING, NEW YORK.

ADJUSTABLE HEAT AND FUEL ECONOMIZER.

1,138,745. Specification of Letters Patent. Patented May 11, 1915.

Application filed June 13, 1914. Serial No. 844,885.

*To all whom it may concern:*

Be it known that I, MANLY M. GILLAM, a citizen of the United States, residing at Flushing, in the county of Queens, Long Island, and State of New York, have invented certain new and useful Improvements in Adjustable Heat and Fuel Economizers, of which the following is a specification.

My present invention relates to a heat and fuel economizer, composed of united sections with provision for the intake of air and with either a unit or divided heated air discharge sections and the sections interiorly each formed with baffling partitions or obstructions each of different formation in the respective sections constituting the composite device and having a damper arranged about the intake and connected therewith to provide instantly for varying the capacity of the economizer in respect to the force and volume of draft currents thereto, without employing intermediate sections between the intake section for air and discharge section for the baffled heated air therefrom as provided for in United States Letters Patent No. 1,107,605 dated August 18th 1914.

My present invention, consists of an adjustable sectional economizer of heat and fuel having a damper arrangement connected with the intake-section of the composite device, for controlling instantly the force and volume of draft currents thereto so as almost instantly to establish economically the utility for the economizer through the uniform retardation of the air currents in passage therein long enough to become superheated and discharging about the fire pot of the stove, range or furnace to appreciably excite combustion of the more or less hot mass of the said fire-pot and with a decided saving in the quantity of fuel used in a given time as well as an increase of heat units resulting from the efficient utilization thereof.

The nature and scope of my present invention will be more fully understood from the following description taken in connection with the accompanying drawings forming part thereof, in which—

Figure 1, is a perspective view of the economizer turned up-side down for use in a stove or range, and consisting of an intake-section with a damper arrangement shown in connection therewith and a unit discharge-section, each section interiorly provided with baffling partitions or obstructions, differing from one another structurally, and the said view as a whole illustrating the composite device, embodying the main features of my said invention in one form thereof. Fig. 2, is a similar view of the economizer in an operative position in a stove or range for use of the type of Fig. 1. Fig. 3, is a perspective view of the economizer on an enlarged scale of that of Fig. 1, provided with divided discharge-sections, and Fig. 4, is a central longitudinal section through the composite-device of Fig. 3, looking from the underside in order to show the damper-arrangement in the intake-section thereof.

Referring to the drawings $a$, is the intake-section of the economizer device for use in a stove or range; and $a^1$, is the unit or divided discharge-section thereof, as clearly illustrated in Figs. 1, 3 and 4. The intake-section interiorly is provided with baffling partitions or obstructions $a^3$, differing from those $a^4$, in the unit discharge section $a^1$. The said intake-section $a$, in one portion is provided with an inlet $a^5$, and in the opposite end portions with outlets $a^6$ and $a^7$, to which are fitted tenons $a^8$ and $a^9$, of the unit section $a$, or divided discharge-sections $a^1$, for maintaining the two or more hollow sections interiorly provided with baffling-means, in proper alining relationship to each other in the stove or range $c$, for superheating the retarded air by its being momentarily baffled therein, in passage therethrough and prior to its discharge over the inflamed mass of the fire-pot of the stove or range $c$, as clearly illustrated in Fig. 2, so as to effect expeditiously combustion of the free carbon given off by the fuel being burned in the combustion chamber thereof as well as largely reducing the proportion of unconsumed gases ordinarily passing to the chimney and wasted.

There is thus provided in an economizer in the manner as described having a damper arrangement, regulatable at will, from the intake-tube, to be more fully described, an arrangement to supply secondary or superheated air continually and deliverable directly above or about the inflamed mass of the combustion chamber of the stove, range or furnace to give a much greater quantity of heat as a resultant product from the consumed fuel of the combustion chamber in a given time from a given quantity of fuel consumed.

The internal baffling of the admitted air with the heat of the inbetween and surrounding walls furnishes the very best extraneous conditions for the internal passing air to be superheated by gradually increasing degree in its coursings and prior to discharge into the combustion chamber of the stove, range or furnace, for the defined purposes.

The damper arrangement $b$, is located in the intake tube $a^5$, and consists preferably of a flap or wing $b^1$, in crescent or other form and in one portion it is connected with a vertical depending rod $b^2$, Figs. 1 and 2, engaged by a flat bent spring $b^3$, fitting the circular wall of the inlet of the intake section to hold it in operative position under the tension of the said spring and the crimped portion $b^4$, of the said spring $b^3$, forms the bearing for the rod $b^2$, in such position. The said rod $b^2$, is operable from the oven chamber $c^1$, so as to readily increase or decrease the force and volume of admitted air currents to be superheated in the intake-section, as will be readily understood from Fig. 2. The above described arrangement permits of quickly increasing or decreasing the size of the inlet-aperture to the intake-section so as thereby to almost instantly control the force and volume of admitted air to the intake-section of the said economizer to be superheated, prior to the discharge of the superheated air in the said section and without necessity for employing intermediate hollow baffling sections inbetween the said intake-section and unit section $a$, or divided discharge sections $a^1$, as in my prior U. S. Patent, No. 1,107,605.

Having thus described the nature and objects of my invention, what I claim as new and desire to secure by Letters Patent is:—

1. An adjustable heat and fuel economizer, comprising intake and discharge sections removably fitted to each other and each provided with baffling-means and a damper arranged about the inlet of said intake-section having actuating means mounted in and contouring with said inlet and operable from one side of said intake-section.

2. An adjustable heat and fuel economizer, comprising an intake-section, a divided discharge-section removably fitting the intake-section, a damper arranged about the inlet of the intake section, spring acting means mounted in and contouring with said inlet for positioning said damper and a rod for sliding the same and operable from one side of said intake-section.

In witness whereof, I have hereunto set my signature in the presence of two subscribing witnesses.

MANLY M. GILLAM.

Witnesses:
Geo. C. Burbank,
J. Walter Douglass.

Copies of this patent may be obtained for five cents each, by addressing the "Commissioner of Patents, Washington, D. C."